United States Patent [19]

Kemp et al.

[11] Patent Number: 5,119,088
[45] Date of Patent: Jun. 2, 1992

[54] METHOD FOR THE IDENTIFICATION OF PERIPHERAL EQUIPMENT WITHIN A DIGITAL COMMUNICATION SYSTEM

[75] Inventors: Christopher Kemp, Dortmund; Uwe Knaak, Recklinghausen, both of Fed. Rep. of Germany

[73] Assignee: Siemens Aktiengesellschaft, Munich, Fed. Rep. of Germany

[21] Appl. No.: 548,930

[22] PCT Filed: Oct. 13, 1988

[86] PCT No.: PCT/DE88/00641
§ 371 Date: Jul. 25, 1990
§ 102(e) Date: Jul. 25, 1990

[87] PCT Pub. No.: WO89/07870
PCT Pub. Date: Aug. 24, 1989

[30] Foreign Application Priority Data

Feb. 12, 1988 [DE] Fed. Rep. of Germany ....... 3804819

[51] Int. Cl.$^5$ ............................................. H04Q 3/545
[52] U.S. Cl. ............................ 340/825.07; 340/825.17
[58] Field of Search ........................ 340/825.07, 825.17, 340/825.15, 825.54, 825.52; 370/67, 110.1; 364/900; 361/392, 393, 395

[56] References Cited

U.S. PATENT DOCUMENTS 4,701,878 10/1987 Gunkel et al. .......................... 364/900
4,890,102 12/1989 Oliver ................................ 340/825.17
4,975,903 12/1990 Wakerly et al. .......................... 370/67

FOREIGN PATENT DOCUMENTS 0231630 8/1987 European Pat. Off. .
3329556 3/1985 Fed. Rep. of Germany .

OTHER PUBLICATIONS

"The Meridian DV-1 system architecture" by Ned Asam & Bill Williams, Telesis Band, 12 (1985) No. 3, Ottawa, Canada pp. 13-19.
Liu et al, "A Working Research Prototype of an ISDN cental office", IEEE Journal on Selected areas in Communications, vol. SAC-4, No 8, Nov. 1986, pp. 1241-1250.

Primary Examiner—Donald J. Yusko
Assistant Examiner—Edwin C. Holloway, III
Attorney, Agent, or Firm—Hill, Van Santen, Steadman & Simpson

[57] ABSTRACT

A method for the identification of peripheral equipment within a digital communication system, particularly a message switching system, having a central data processor as central controller and having a plurality of decentralized input/output processors equipped as subscriber and line sets with memory that control the peripheral equipment, the decentralized input/output processors being respectively in communication via a peripheral interface means with the central data processor. A set address (SA), a set type (ST) and an identifier of the memory capacity of the peripheral equipment are transmitted to the central data processor with the assistance of interface means (PBC), the central data processor subsequently transmitting a set-associated memory load information as memory load call signal via the data bus (DBUS) to the interface means (PBC) and, thus, to the memory (SRM). Such a method is employed for the identification of peripheral equipment in view of the presence thereof and the functionality thereof within the communication system.

5 Claims, 3 Drawing Sheets

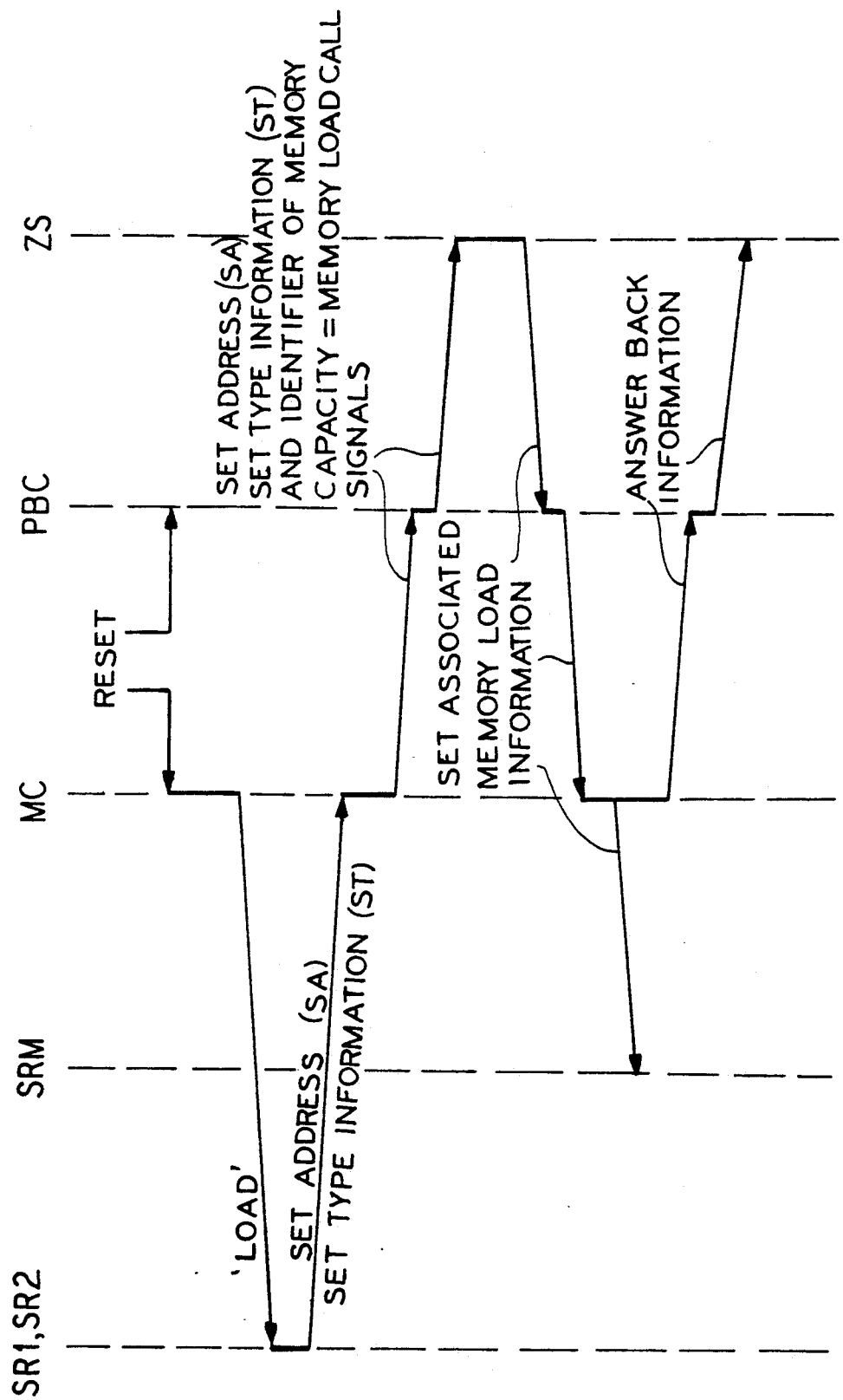

METHOD FOR THE IDENTIFICATION OF PERIPHERAL EQUIPMENT WITHIN A DIGITAL COMMUNICATION SYSTEM

BACKGROUND OF THE INVENTION

The invention is directed to a method for the identification of peripheral equipment within a digital communication system, particularly a message switching system, comprising a central data processor as central controller and comprising a plurality of decentralized input/output processors that are equipped with memories as subscriber and line sets and control the peripheral equipment, said decentralized input/output processors being respectively in communication with the central data processor via a peripheral interface means.

Communication systems defined in such fashion represent modularly constructed private branch exchanges having few standard interfaces that are built in a great variety of system sizes corresponding to the jobs to be met. These message switching systems as private branch exchanges can be connected both to public networks and public services—telephone network, teletex network, etc.—as well as to private networks—sub-systems, tie trunk lines. Analog and digital terminal equipment are provided as subscriber terminals. Via corresponding interfaces, there is also an additional possibility of connecting external equipment such as printers, operations-related terminals (PC), etc.

The system architecture of the different communications systems is uniformly structured in three levels: Periphery, decentralized input/output processors and central processor.

Accordingly, assemblies as interfaces to the connected terminal equipment and lines (subscriber sets, line sets) and assemblies for call setup such as signalling equipment, transmitters and receivers belong to the periphery. The chronologically critical handling of the periphery is thereby assumed by the decentralized input/output processors, whereby the number of peripheral equipment or, respectively, the number of connector sets for every input/output processor is limited dependent on the maximum, overall data set to be processed. Among other things, the input/output processors are thus provided for the control of the standard interfaces and local busses, of the digit interpretation, of the connection of tone clocks and call clocks and of dependability-oriented displays. The central data processor, by contrast, coordinates the control of all equipment present in the communication system via appropriate bus connections. The reset logic and dependability-oriented events are also centrally controlled by the central data processor.

The interface between the decentralized input/output processor and the central data processor is enabled by a memory that can be written and read out by both processors. The control of this memory usually ensues on the basis of the operating system that is employed.

SUMMARY OF THE INVENTION

As already mentioned, the message switching systems are constructed in the greatest variety of system sizes, so that the wide variety of peripheral equipment cannot always be assigned to permanently preplanned plugin locations given an optimum design of the required space need, particularly in view of the differing number in the different systems. This results therein that the operating system that is respectively employed must be respectively adapted to the different system configurations, particularly in view of the different addressings of the peripheral equipment. The object underlying the invention is comprised in avoiding these cost-intensive adaptations of the operating systems to the various system sizes of the communication systems and, using the lowest possible material outlay to create an operating system that is independent of the system configuration to the farthest-reaching degree with which the spatial presence of the peripheral equipment can be identified and with which the functionability thereof can also be enabled.

This is inventively achieved in that, upon activation of a peripheral equipment, the interface means thereof and the input/output processor thereof are reset by a reset signal; in that, for the identification of the peripheral equipment, the set address with a byte 0, the set type information with a byte 1 and an identification of the memory capacity corresponding to the peripheral equipment with further bytes 2, 3 are transmitted to the input/output processor; in that the set address, the set type information and the identifier for the memory capacity are transmitted to the central data processor via the data bus of the interface means, transmitted thereto as memory load call signals; in that the memory load call signal effects the transmission of a set-associated memory load information in the central data processor that can be transmitted via the data bus to the interface means into the memory of the respective peripheral equipment; and in that the memory load information is acknowledged by the respective decentralized input/output processor with an active answerback information that can be stored in the central data processor.

What is achieved with this method is that the central data processor receives the set address, the set type information and the existing memory capacity of the respective peripheral equipment communicated to it immediately upon the activation of the peripheral equipment, i.e. when these equipment are plugged into a corresponding location receptacle of the message switching system and/or when the voltage is turned on. In response thereto, the central data processor can communicate the specific memory load information for every peripheral equipment—regardless of the plug-in locations thereof—and both the functionability of the corresponding peripheral equipment as well as the spatial presence thereof within the location receptacle can be determined with the active answerback information transmitted subsequently thereto. With the reception of the identifier of the memory capacity as part of the memory load call signal, i.e. with the message as to what memory capacity the respective peripheral equipment contains, the data processor can also correspondingly adapt the memory load information and, by storing this information can correspondingly control the data flow required for the function of the peripheral equipment.

It is to be considered critical for the invention that all method steps for the identification of the peripheral equipment can be undertaken with switch equipment that are already present in the subscriber and line sets and, thus, no additional requirement and material outlay for these peripheral equipment are needed.

It is provided in an advantageous development of the invention that the activation of the peripheral equipment and a successful conclusion of the loading status of the active answerback information can be displayed by an equipment-associated display means. Immediately after the activation of the peripheral equipment, thus, the functionability thereof can be optically displayed within the communication system.

Another advantageous development of the invention provides that the equipment-associated display means can be influenced by a manual inhibit means of the respective peripheral equipment and peripheral equipment can thus be effectively inhibited by manual operations independently of the operating system. Manually controllable inhibit measures are conceivable given malfunctions or in test cases.

In a further advantageous development of the invention, the equipment-associated display means can be additionally controlled such that a continuous signal, an interrupt signal in the loading and working condition of the peripheral equipment and the disconnect of the continuous signal in the quiescent condition of the peripheral equipment, is connectible and, in an additional development of the invention, the loading condition and the working condition of the peripheral equipment are marked by different time sequences of the interrupt signal. Function statuses that, insofar as they are not reached in case of malfunction, allow conclusions about malfunctions of the respective peripheral equipment can be additionally made visible in a simple way with these method steps.

BRIEF DESCRIPTION OF THE DRAWINGS

The invention shall be set forth in greater detail on the basis of an exemplary embodiment illustrated in three figures, whereby

FIG. 3 depicts the method steps of the present invention.

DESCRIPTION OF THE PREFERRED EMBODIMENT

The digitally controlled communication system is realized with the said switching system NVA whose terminal equipment EGm, EGn can be connected to corresponding subscriber sets TSm, TSn via connecting paths (not shown in detail) having line sets LSx, LSy and lines Lx, Ly. The central controller ZS that, among other things, contains the central data processing is situated within the message switching system NVA.

Figure 1:
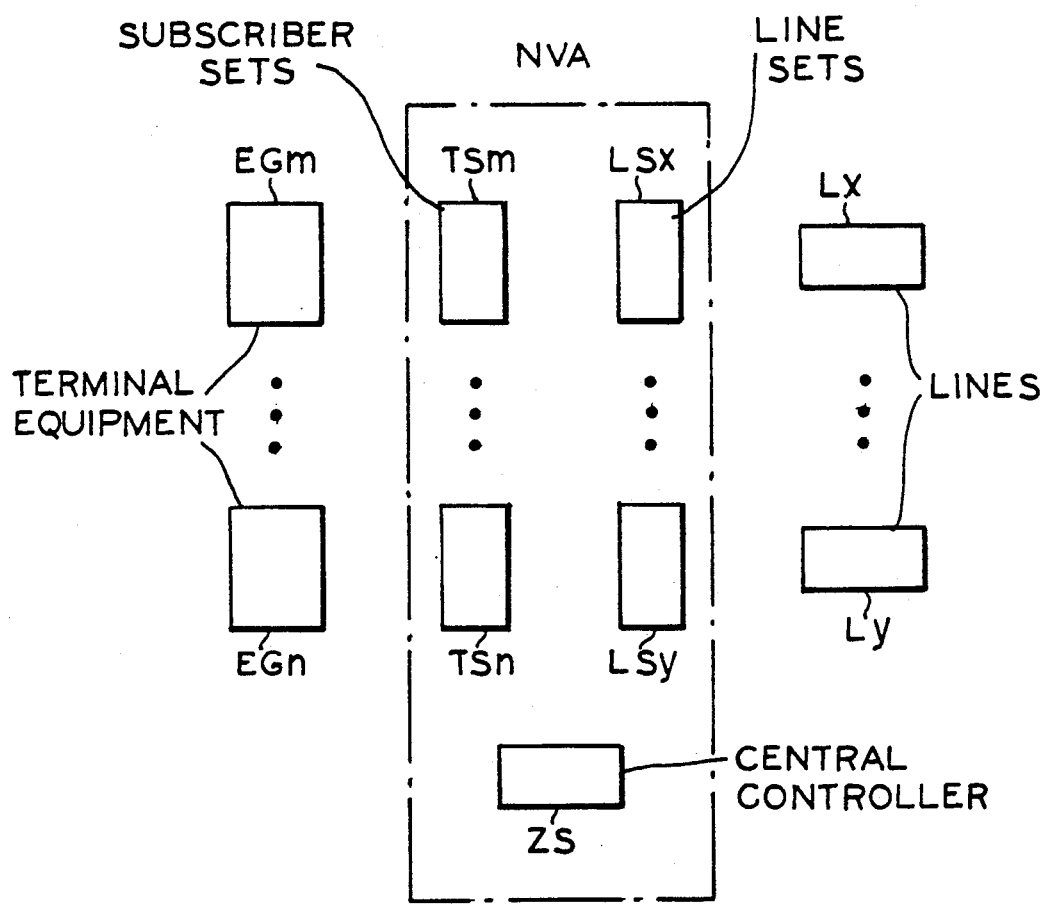
FIG. 1 shows the fundamental system configuration of a message switching system, whereas FIG. 2 switching and control equipment of subscriber and line sets of the peripheral equipment in a scope necessary for an understanding of the invention.
Figure 2:
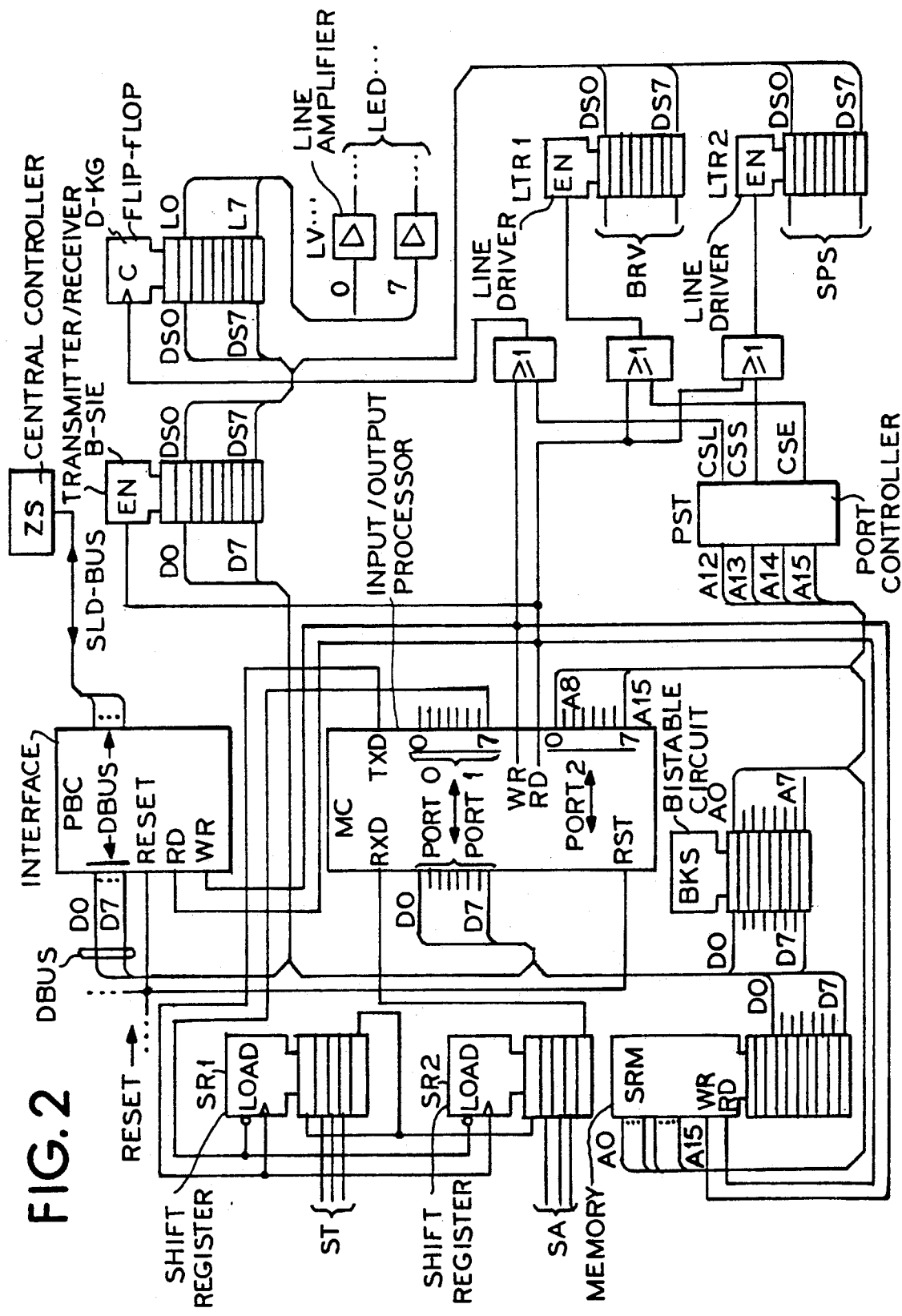

FIG. 2 shows excerpts of switching and control equipment of subscriber and line sets with which the method for the identification of the peripheral equipment is controlled. The input/output processor MC and the interface means PBC are thereby to be viewed as being essential switch equipment, these being connected to one another via the data bus DBUS having the central office lines D0 through D7. The memory SRM and the bistable circuit BKS are also connected to the same data bus DBUS. The central data processor (not shown) and the interface means PBC correspond in a known way via what are referred as HDLC interfaces that are not separately shown.

The data bus DBUS is also connected to the bus transmitter/receiver B-SIE that, in combination with a D-flipflop D-KG and the line amplifiers LV . . . , control the display means LED . . . . The shift registers SR1, SR2 may also be seen, whereby the output of the first shift register SR1 is simultaneously fedback onto its input and onto the input of the second shift register SR2. It is also shown that the first shift register SR1 receives the set type ST as information, whereas the second shift register SR2 contains the set address SA of the respective peripheral equipment. The set type ST, for example, can be achieved by a bridge variant circuit in which different potential can be optionally adjacent at the different input lines. The set address SA, by contrast, is generated when the peripheral equipment is plugged in, being generated by a designational arrangement of contact pins for the respective peripheral equipment. It is also indicated that the loading and the time clock for the two shift registers SR1, SR2 ensues on the basis of the input/output processor MC that accepts the set address SA and the set type ST from the respective shift register SR1, SR2 via the input line RXD. It is also shown that the input/output processor can control the memory SRM and the port controller means PST via the address lines A8 through A15, whereas the bistable circuit BKS is in communication with the memory SRM via the address lines A0 through A7.

The port controller means PST that is realized with a demultiplexer means contains the first output line CSL for lamp control, the second output lines CSS for reading out the respective inhibit condition of the peripheral equipment and the third output line CSE with which auxiliary indicators that refer to the respective peripheral equipment can be interrogated by the authorization variant BRV via the first line driver LTR1. The second line driver LTR2 serves the purpose of manually inhibiting peripheral equipment, whereby an inhibit potential SPS can be designationally connected with inhibit keys to the unreferenced input lines of the second line driver LTR2. In order to be able to drive the line amplifiers LV . . . and, accordingly, the display means LED . . . , the information via the data bus DBUS having the central office lines D0, D7 are controllable via the bus transmitter/receiver B-SIE onto the further central office lines DS0, DS7 that in turn form an additional data bus with the D-flipflop D-KG and the first and second line drivers LTR1, LTR2.

The method of the present invention will now be described with reference to FIG. 3.

Upon activation of a peripheral equipment, thus, a reset signal (RESET) is generated that resets both the interface equipment PPC as well as the input/output processor MC into their quiescent condition. When the peripheral equipment is placed under voltage or, respectively, plugged in, then, as what is referred to as a hard reset, this reset signal RESET is transmitted to the data processor (not shown) in order to thus identify without delay the presence or, respectively, the non-presence of the peripheral equipment within the communication system. For the identification of the peripheral equipment, the set address SA (with a byte 0) is communicated to the input/output processor MC via the second shift register SR2 and, following thereupon, the set type ST (with the byte 1) is communicated to the input/output processor MC via the first and second shift registers SR1, SR2 via the input line RXD, being communicated thereto byte-by-byte. Further, the memory capacity identifier is identified by the input/output processor MC by byte 2 and 3 and is transmitted in a known way to the data processor (not shown) via the data bus DBUS of the interface means PBC. The data processor interprets these data as memory load call signal and, in response thereto, transmits the set-associated memory load information to the peripheral equipment. This memory load information is transferred via the same data bus DBUS of the interface equipment PBC into the memory SRM of the respective peripheral equipment. The acceptance of the memory load information is then acknowledged by the input/output processor MC with an active answerback information to the central data processor. Both the spatial presence of the peripheral equipment within the communication system as well as the functionability thereof are thus identified with this active answerback information that is stored within the central data processor, so that this peripheral equipment is available for setting up connections within the communication system.

The activation of the peripheral equipment as well as the successful conclusion of this loading status with the active answerback information can be made visible with equipment-associated display means LED . . . , so that specific statuses of the peripheral equipment can be made identifiable for the user. For example, the activation of the peripheral equipment can thus be displayed by a continuous signal that is displayed by an interrupt signal in the loading and working condition of the peripheral equipment, i.e. during correspondence with the data processor, whereby the conclusion of this loading process and, thus, the quiescent condition of the peripheral equipment ensues by shutting the continuous signal off. The clock control of the interface equipment PBC and the input/output processor MC are controlled by a central time clock that, together with its control lines, is not shown.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

We claim:

1. A method for the identification of peripheral equipment within a digital communication system, particularly a message switching system, having a central data processor as central controller and having a plurality of decentralized input/output processors equipped with memory as subscriber and line sets that control the peripheral equipment, said decentralized input/output processors being respectively in communication with the central data processor via a peripheral interface means, whereby set type information is provided for the identification of the input/output processors and set addresses are provided for the selection of the input/output processors, comprising the steps of:

upon activation of a peripheral equipment,
resetting the interface means thereof and the input/output processor thereof by a reset signal;
reading by means of the input/output processor the set address with a byte 0 from a set address means, the set type information with a byte 1 from a set type means and generating an identifier of memory capacity corresponding to the peripheral equipment with further bytes 2, 3 in the input/output processor for the identification of the peripheral equipment;
transmitting the set address, the set type information and the identifier for memory capacity to the central data processor via a data bus of the interface means as memory load call signals;
effecting by means of the memory load call signal the transmission of a set-associated memory load information in the central data processor that is transmitted by the data bus to the interface means into a memory of the respective peripheral equipment;
acknowledging the memory load information by the respective decentralized input/output processor with an active answerback information that can be stored in the central data processor.

2. The method according to claim 1, wherein the activation of the peripheral equipment and a successful conclusion of a load condition with the active answerback information is displayed by an equipment-associated display means.

3. The method according to claim 2, wherein the equipment-associated display means can be controlled by a manual inhibit means of the respective peripheral equipment.

4. The method according to claim 2, wherein the equipment-associated display means can be controlled such that, with the activation of the peripheral equipment, a continuous signal, an interrupt signal in the loading and working condition of the peripheral equipment and a disconnection of the continuous signal in quiescent condition of peripheral equipment, is switchable.

5. The method according to claim 4, wherein the loading condition and operating condition of the peripheral equipment are marked by different time sequence of the interrupt signal.

* * * * *